Feb. 13, 1934.   W. PRUSSING   1,947,171
TUBE MAKING, CAPPING, PRINTING, AND ENAMELING MACHINE
Filed Dec. 31, 1931   7 Sheets-Sheet 1
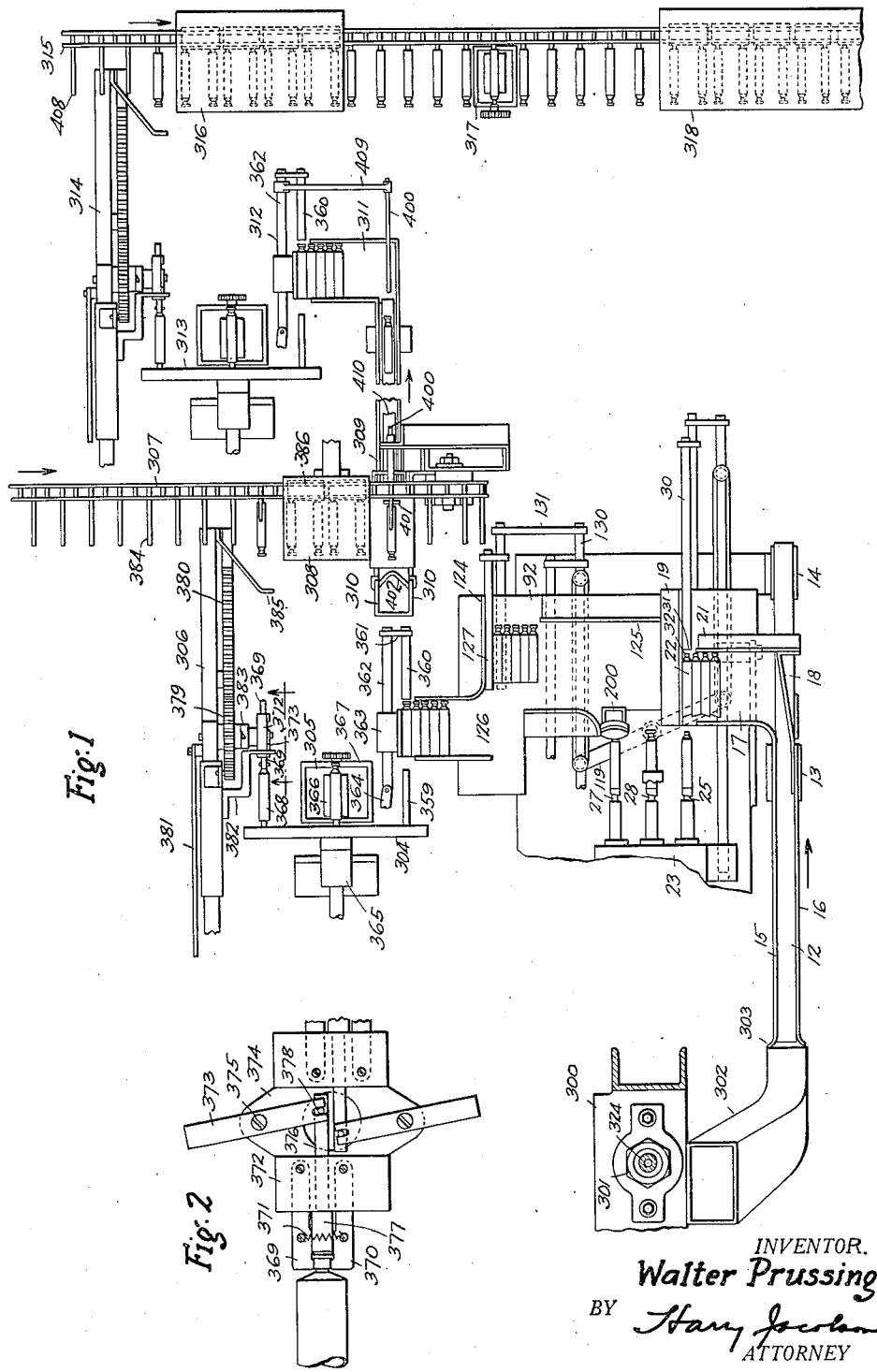
INVENTOR.
Walter Prussing
BY
ATTORNEY Feb. 13, 1934.  W. PRUSSING  1,947,171
TUBE MAKING, CAPPING, PRINTING, AND ENAMELING MACHINE
Filed Dec. 31, 1931  7 Sheets-Sheet 3
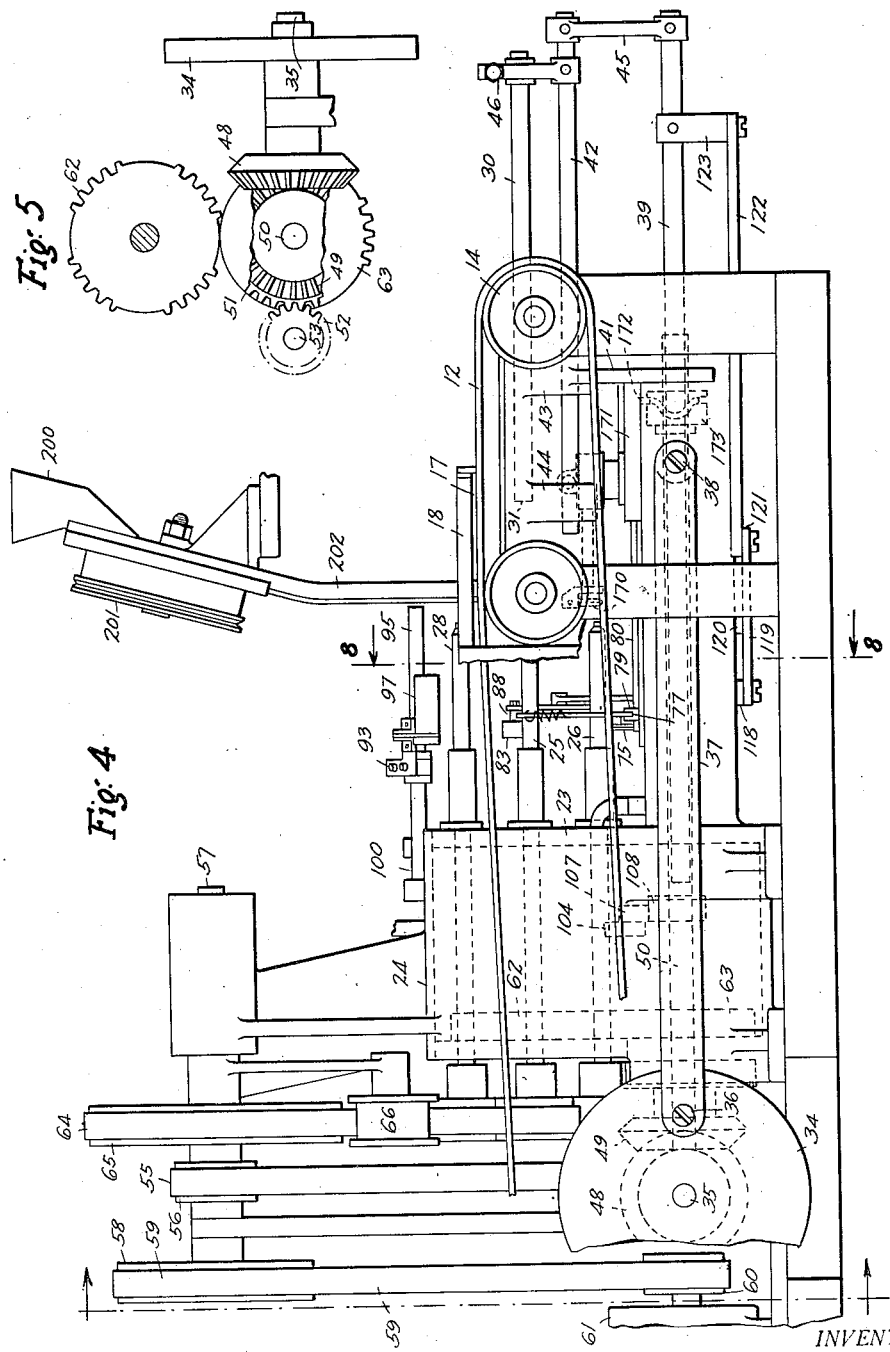
INVENTOR.
Walter Prussing
BY
ATTORNEY Feb. 13, 1934.    W. PRUSSING    1,947,171
TUBE MAKING, CAPPING, PRINTING, AND ENAMELING MACHINE
Filed Dec. 31, 1931    7 Sheets-Sheet 4

INVENTOR.
Walter Prussing
BY Harry Jacobson
ATTORNEY

Feb. 13, 1934. W. PRUSSING 1,947,171
TUBE MAKING, CAPPING, PRINTING, AND ENAMELING MACHINE
Filed Dec. 31, 1931 7 Sheets-Sheet 5
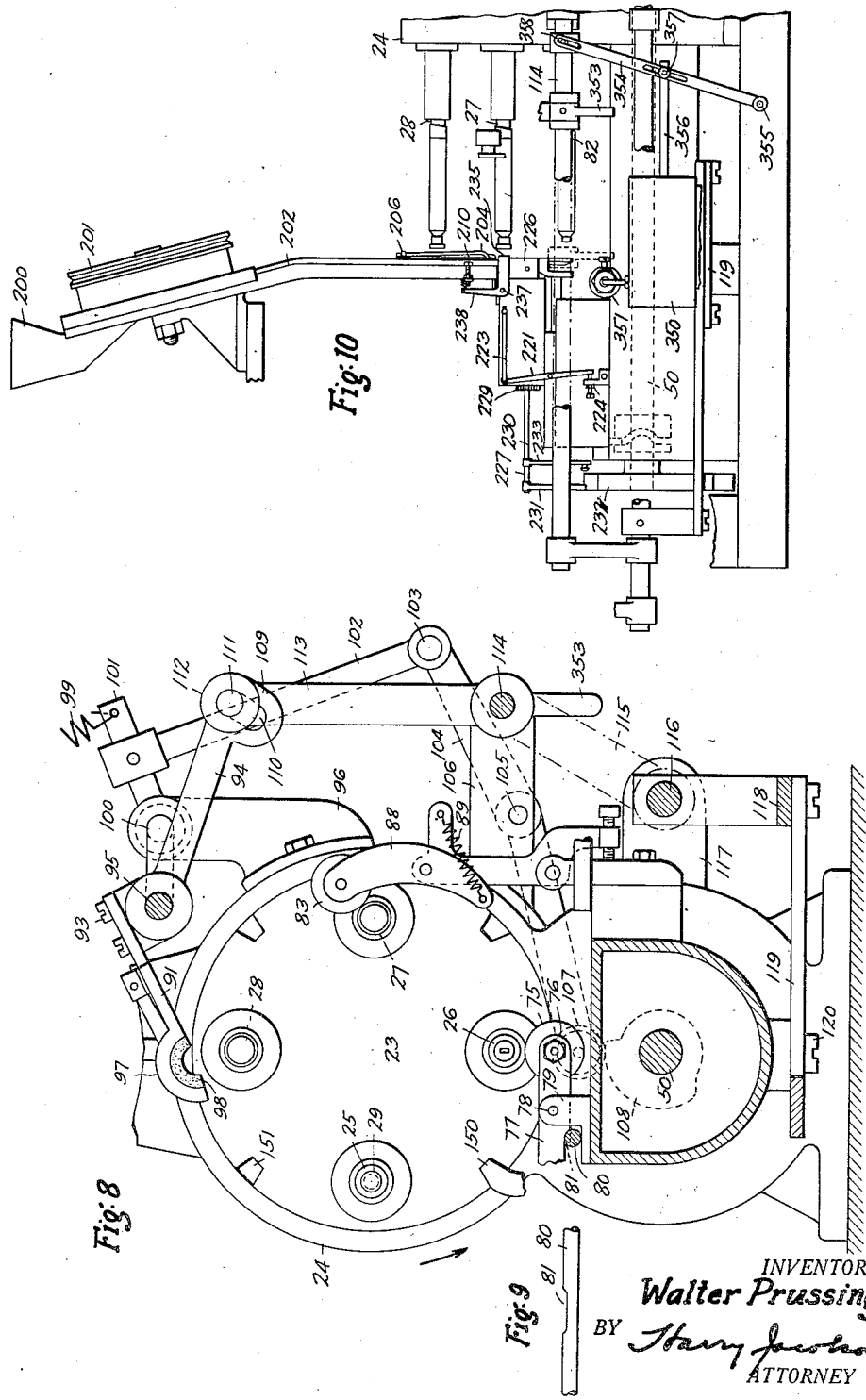
INVENTOR.
Walter Prussing
BY
ATTORNEY Feb. 13, 1934. W. PRUSSING 1,947,171
TUBE MAKING, CAPPING, PRINTING, AND ENAMELING MACHINE
Filed Dec. 31, 1931 7 Sheets-Sheet 6
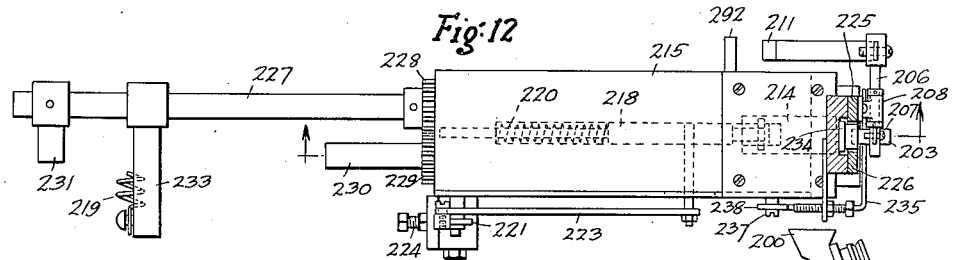
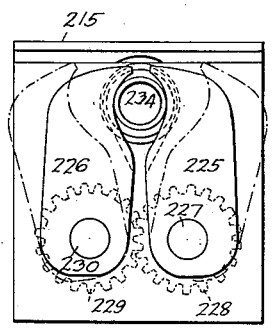
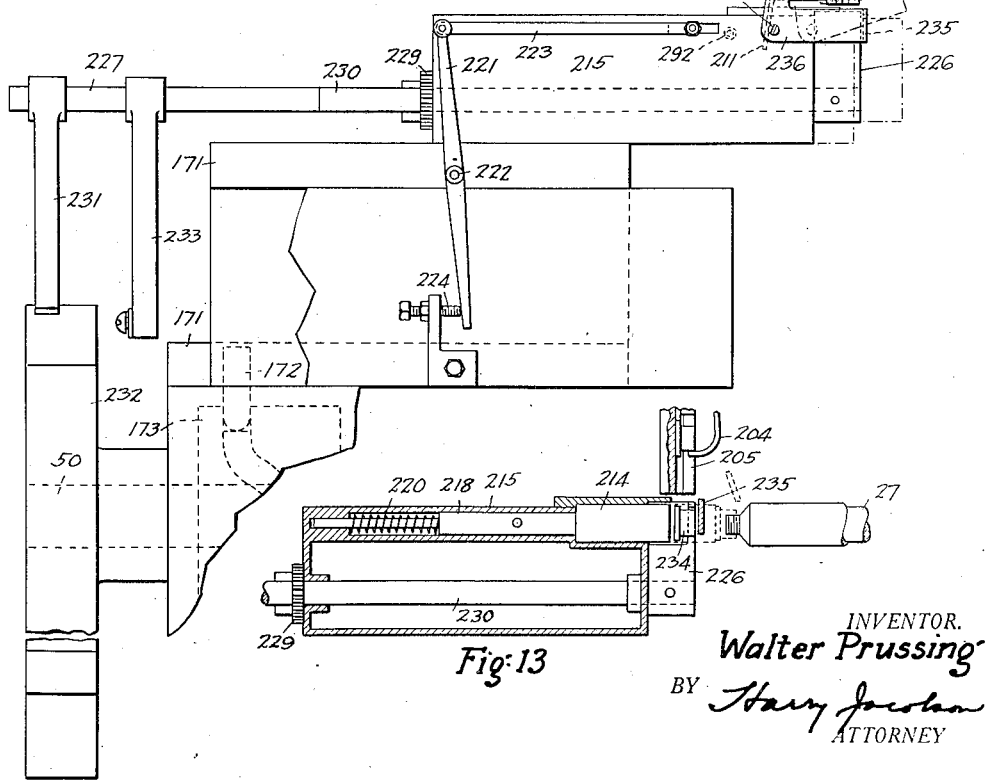
INVENTOR.
Walter Prussing
BY Harry Jacobson
ATTORNEY Feb. 13, 1934. W. PRUSSING 1,947,171
TUBE MAKING, CAPPING, PRINTING, AND ENAMELING MACHINE
Filed Dec. 31, 1931 7 Sheets-Sheet 7
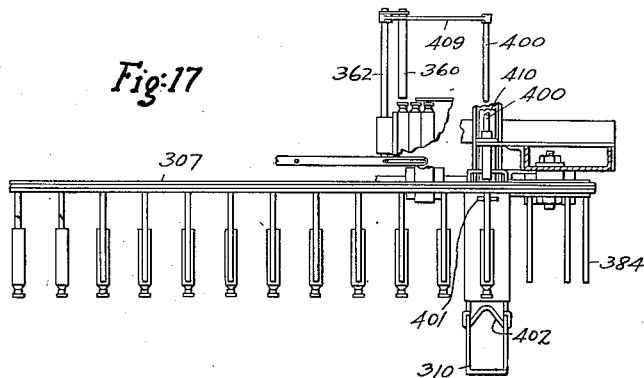
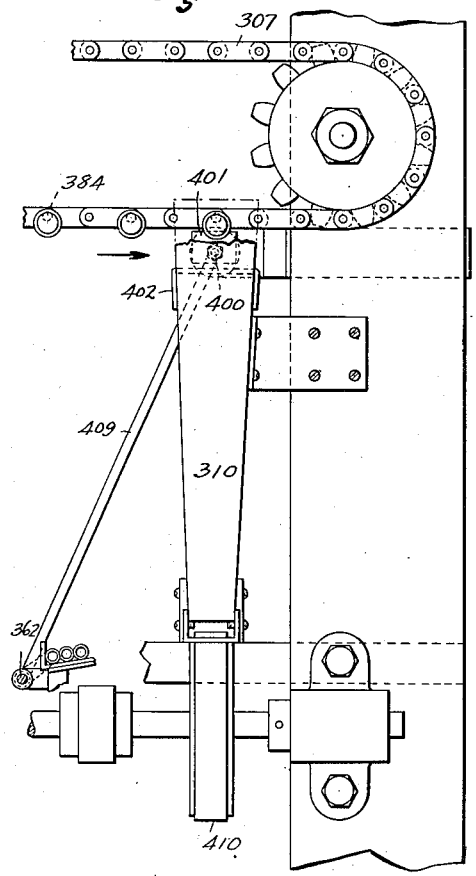
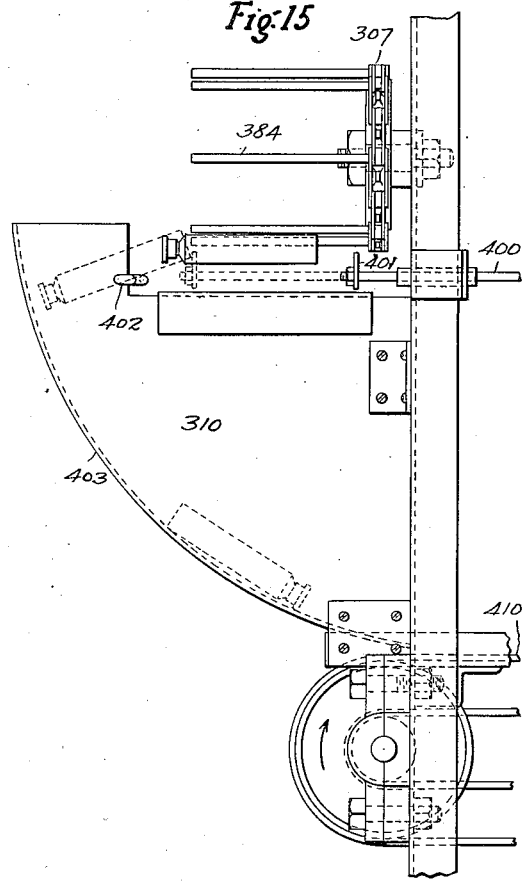
INVENTOR.
Walter Prussing
BY
ATTORNEY Patented Feb. 13, 1934

1,947,171

UNITED STATES PATENT OFFICE 1,947,171

TUBE MAKING, CAPPING, PRINTING AND ENAMELING MACHINE

Walter Prussing, Brooklyn, N. Y.

Application December 31, 1931, Serial No. 584,047, and in Canada May 1, 1931

27 Claims. (Cl. 29—38)

This invention relates to machines for operating upon thin metal collapsible tubes such as those used to hold shaving cream, tooth-paste, and the like.

Since tubes of this type are easily dented or otherwise damaged, it is highly desirable to perform as many operations thereon as possible, automatically, to avoid the manual handling of the tubes which results in the greatest factor of expense, damage and waste.

My invention contemplates the provision of means for performing all the necessary operations automatically to make a finished, capped, enameled and printed tube from a disc of metal, ready for the reception of the contents through the open end of the finished tube. The means includes a press in which the tube is extruded in its unfinished form from a comparatively thick metal disc, and of means for forwarding the tube from the press and for automatically mounting it in position so that it may be trimmed, threaded and capped. My invention further contemplates the provision of means for automatically trimming both ends of the tube, then automatically removing the capped tube from the machine for further operation thereon.

My invention further contemplates remounting and enameling the capped tube, for removing, advancing and drying the wet enameled and capped tube, for then remounting the enameled and capped tube upon a printing machine which prints the surface of the tube, for then drying the tube, and if necessary, lacquering the tube and again drying it.

It will be seen, therefore, that my invention comprises the method of performing all the necessary operations for producing a finished tube from a slug of metal, the operations being performed entirely automatically from beginning to end without the necessity for any operator handling the tube at any intermediate stage.

My invention further contemplates the provision of suitable sub-mechanisms for performing the various operations above described automatically, it being understood that great advantages in saving of labor and in the avoidance of waste, result from the automatic manufacture of such tubes.

The various objects of my invention will be clear from the description which follows, and from the drawings, in which, Fig. 1 is a top plan view of my new machine, showing diagrammatically, the various sub-mechanisms assembled in their proper cooperative relation and illustrating, particularly, the method of and the means for manufacturing a complete collapsible tube from a slug of metal, ready for the insertion of the contents into the open ends of the printed and capped tubes.

Fig. 2 is a front view of a detail of the jaws for gripping the capped tube, and for removing the tube from one of the coating mechanisms, preparatory to transferring the coated and capped tube to a suitable drying conveyor.

Fig. 4 is a front elevation of the same.

Fig. 5 is an end elevation of the driving mechanism for the operating crank of the trimming and capping mechanism.

Fig. 8 is a vertical section, taken on the line 8—8 of Fig. 4.

Fig. 9 is a front elevation of the cam rod for operating the trimming cutter.

Fig. 10 is an elevation of the trimming and capping mechanism.

Fig. 11 is an enlarged elevation, partly in section, of the means for capping the tube.

Fig. 12 is a top plan view of the same, partly in section.

Fig. 13 is a partial elevation and partial section of the cap forwarding and applying means.

Fig. 14 is a side elevation of the cap gripping and forwarding jaws.

Fig. 15 is a front elevation of the means for removing the capped and enameled tube from a conveyor and for delivering said tube to the printing mechanism.

Fig. 16 is a side elevation thereof, and

Fig. 17 is a top plan view thereof.

Figure 3:
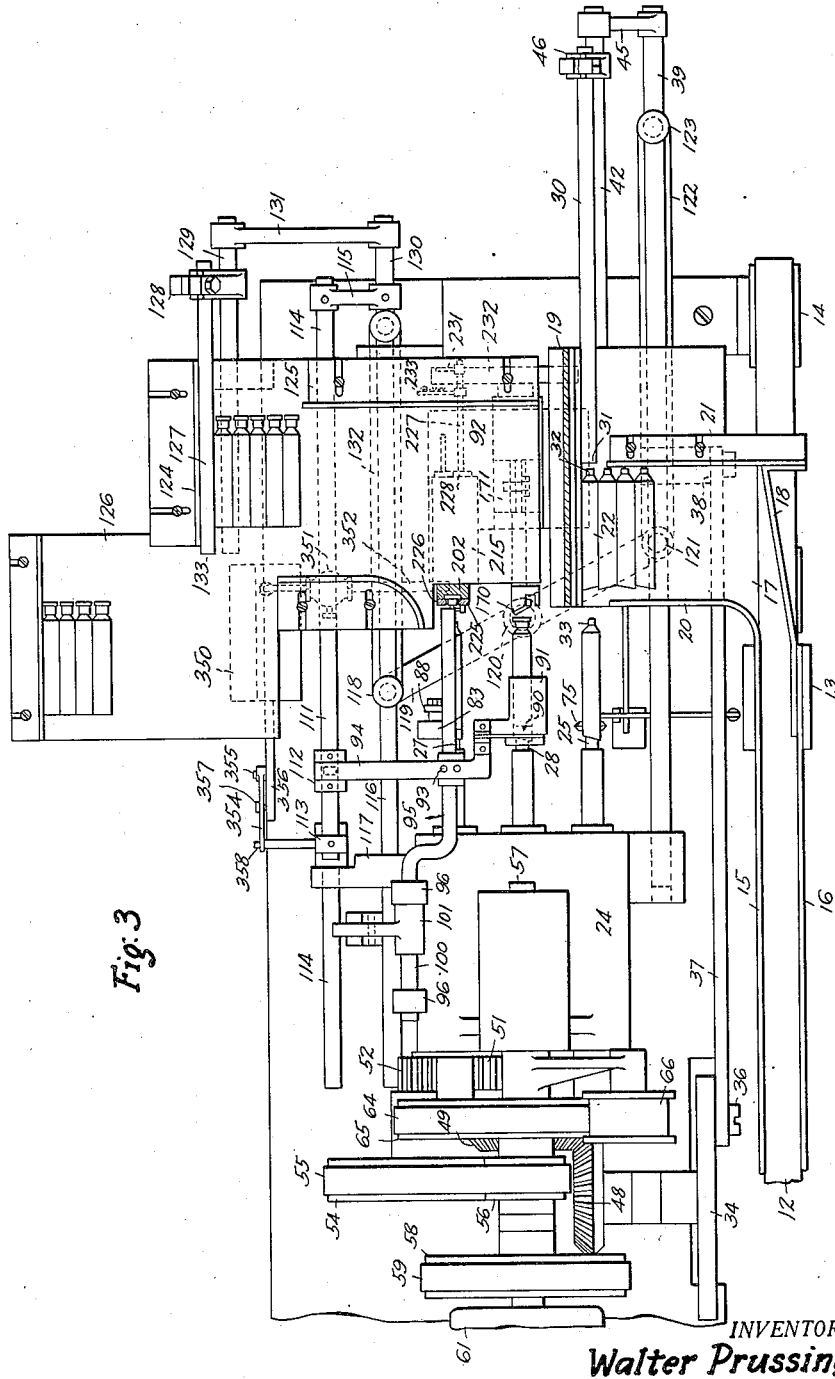
Fig. 3 is a top plan view of the mechanism for receiving the unfinished tube from the extruding press and for mounting, trimming and capping the tube.

In that practical embodiment of my invention which I have illustrated by way of example, and referring particularly to Fig. 1, I have shown a series of instrumentalities operatively connected and cooperating to produce a completely finished and capped tube automatically. The instrumentalities derive their movement from a source of power, not necessary to be shown nor described in detail. The article produced by my machines as has been indicated, is a completely finished collapsible tube, with a cap mounted thereon, and enameled, printed and lacquered on its outer surface ready for sale to the trade.

It will be understood that the purchaser of the tubes receives the tubes completely formed, painted and capped except that the larger ends thereof are open for the insertion of the pasty material. The purchaser inserts the material and closes the tube, ready for sale to the consumer.

In the description which follows, certain sub-mechanisms, which are at present well known, will be illustrated more or less diagrammatically, and briefly described so that a clear understanding may be had of the entire machine. For example, in Fig. 1, the extruding press 300 is shown in diagrammatic form, a female die as 301 being provided on a suitable table, and known mechanism being used for automatically feeding comparatively thick slugs, in the form of discs or coins into the press. As is common in such machines, a reciprocatory plunger or male die 324, of much greater length than the height of the die 301 enters said die and squeezes the coin-shaped disc in such a manner that the comparatively soft metal of said disc is extruded, meaning that it squirts or flows rapidly out of the female die around the cylindrical male die, thereby resulting in a thin walled cylindrical collapsible tube having an open end. Mechanism not necessary to be shown nor described then automatically discharges or strips the extruded tube from the male die as is shown for example in my co-pending application for patent for Extruding machine, filed January 31st, 1929, Serial No. 336,368.

For the reception of the extruded and unfinished collapsible tube thus formed in the press 300 and discharged therefrom, I have provided a suitable chute as 302, into which the tube falls. At the lower end 303 of said chute, a suitable belt 12, continuously driven by suitable pulleys as 13 and 14, conveys the extruded tube from the chute to the tube finishing, threading and capping mechanism.

Said mechanism will be later described in detail, but a brief description thereof at this point may be helpful.

The unfinished tubes, which are continuously supplied to said belt by the press 300 in their proper longitudinal positions, that is, with the necks of the tubes leading, are gradually forced off the belt 12 on to the supporting plate 17, rolling down to the end of said plate by gravity and arranging themselves in parallel relation, with the necks of the tubes towards the right, as shown in Fig. 1. The last tube of the row on the plate 17 may now be mounted on one of the mandrels of the rotatable turret 23. As the turret rotates intermittently, suitable mechanism operates upon the tubes first to trim the neck and the open end of the tube, then to thread the neck, then to apply a cap to the threaded neck, and then to dismount the capped tube from the mandrel, whereby the capped tube falls on the chute or plate 92, and rolls down against the angle plate 124 against the previously discharged cap tubes to form a row. The last tube of the row may then be transferred to the plate 126 to form another row, after which a transfer mechanism may remove the last tube of the second row, and transfer the tube on to one of the mandrels of the enameling turret 304. The outer surface of the tube is then coated with a layer of enamel by the enameling mechanism 305, whereafter the capped and enameled tube is removed from the mandrel of the enameling mechanism and transferred by the transfer mechanism 306 to the pins of a conveyor 307 moving in the direction of the arrow of Fig. 1. The wet enameled and capped tube is carried through a heated drier 308 for a sufficient time to thoroughly dry the enamel, whereafter the capped and enameled tube is removed from the pins of the conveyor 307 by the removal mechanism 309 and dropped into a suitable chute 310.

At the bottom of the chute is arranged a suitable belt 410 which receives the capped and enameled tube and carries said tube in the direction of the arrow to a suitable feed plate 311.

From said feed plate, the transfer mechanism 312 forwards the tube on to the mandrels of the printing mechanism 313 which prints suitable lettering and designs upon the surface of the tube.

The tube thus capped, enameled and printed is removed from the mandrel of the printing mechanism 313 by a transfer mechanism 314 similar to the mechanism 306, placing the wet printed tube on the pins of a conveyor 315 which moves in the direction of the arrow. Said conveyor 315 passes into the drier 316 to dry the wet ink on the tube, whereafter the tube may, if desired, be lacquered as by means of the lacquering mechanism 317 and again dried by its passage through the drier 318, thereby completing the tube ready for shipment or the insertion of the contents thereinto.

It will be seen that the mechanism just briefly described is entirely automatic in its operation and that the various steps of making the tube require no attention, being carried out in one continuous process, it being desirable only at the proper intervals to supply slugs to the press 300, caps to the capping mechanism, and enamel, ink and lacquer to the respective mechanisms using these materials.

Since the specific construction of the press 300 forms no part of the present invention, said press has not been shown nor described in detail, but has been shown diagrammatically only. The trimming, threading and capping mechanism, however, forms an important part or sub-mechanism of my invention, and it will now therefore be fully described.

*Tube finishing and capping mechanism*

As has been explained, after the tubes have been extruded into their unfinished state in the press 300, they are discharged from the press into the chute 302 and reach the conveyor belt 12 (Figs. 1, 3 and 4).

Side guards as 15 and 16 serve to prevent the tubes from leaving the belt and guide said tubes. The tubes are thereby continuously supplied, in their proper longitudinal arrangement with the necks thereof forward, toward the inclined supporting plate 17. Arranged rearwardly of said supporting plate and in the path of the advancing tubes is the discharge plate 18, angularly disposed to the moving belt in such a manner that the tube, as it is forwarded by the belt against the plate 18, is gradually forced off said belt on to the inclined plate 17. The tubes, in succession, roll by gravity toward the front end of said plate against the stop 19, the tubes arranging themselves between the upstanding guards 20 and 21 and in parallel relation, with the necks of the tubes all lying in the same relative position.

The last tube 22 of the row on the plate 17 may now be mounted upon the intermittently rotatable turret 23. Said turret is mounted in the casing 24 forming part of the frame of the machine and carries a multiplicity of identical mandrels as 25, 26, 27 and 28. Each of said mandrels terminates in a threaded tip 29 and is of less diameter than the interior diameter of the tube. The tube 22 is mounted upon the continuously rotating mandrel 25, while the turret is at rest, by the reciprocation of the mounting rod 30, the end 31 of which engages the end 32 of the tube and slides said tube longitudinally, off the plate 17 and on to the mandrel, which at this time is aligned with and coaxially of the tube.

When the neck 33 of the tube reaches the rotating threaded tip 29 of the mandrel, the tip cuts into the interior surface of the neck 33, the tube being prevented from rotating at this time by the pressure on the end thereof exerted by the rod 30. Said rod, however, releases the tube as soon as the tip has cut its way sufficiently into the neck 33 of the tube to grip said tube firmly. The rod 30 is then reciprocated toward the right, as viewed in Figs. 3 and 4, ready for the feeding of the next tube. It will be seen that said rod prevents the succeeding tube in the row from interfering with the mounting operation of the last tube. On the withdrawal of the mounting rod, the next tube of the row together with the remaining tubes roll down along the plate 17, into position wherein said next tube may be fed on to the next mandrel after the turret has been rotated through a quarter turn.

The means for reciprocating the rod 30 comprises the disc crank 34 mounted on the shaft 35 and driven in a manner soon to be described. Pivoted to the crank 34, as at one end 36, is the link 37, which is secured at its other end 38 to the rod 39. Said rod 39 is slidable in a suitable bearing 40, secured to the frame of the machine as by means of the arm 41. To the rod 39 is secured, as by means of the connecting member 45, the parallel rod 42 which is also supported in suitable bearings as 43 and 44 depending from the frame. The mounting rod 30 is in turn adjustably secured to the rod 42, as by means of the connecting member 46, which is adjustably secured to the rod 42 as by means of a suitable clamp. It will be seen that on rotation of the disc crank 34, the link 37 is reciprocated, thereby reciprocating the rods 39 and 42, and the mounting rod 30 as a unit, at the proper time to push the tube 22 on to the proper mandrel 25.

Figure 7:
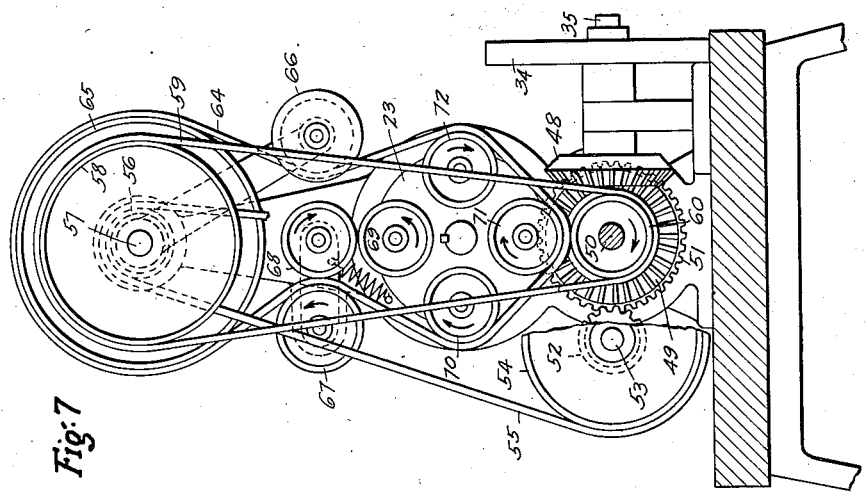
Fig. 7 is a similar view of the other end thereof.

The crank 34 is rotated by means of the bevel gear 48 on the shaft 35, which gear meshes with the bevel gear 49 (Figs. 5 and 7) on the shaft 50. On said shaft 50 is also mounted the gear wheel 51, which meshes with the gear wheel 52 on the shaft 53. On said shaft 53 is also mounted the pulley 54 driven by the belt 55 from the pulley 56 on the upper shaft 57. The shaft 57 is in turn rotated by the pulley 58 thereon, which is driven by the belt 59 from the motor pulley 60.

Said motor pulley, as shown in Fig. 4, is driven by a suitable motor as 61. It will be seen that the motor 61 may rotate continuously and thereby drives the shaft 57 and through the belt 55, drives the shaft 53 and the gear 52 thereon, which in turn rotates the gear wheel 51 and the bevel gear 49 on the shaft 50, and through the bevel gear 48 rotates the crank disc 34 to reciprocate the rod 30 at the proper time.

The means for intermittently rotating the turret 23 through the proper angle, which in this case is an angle of 90°, to bring the various mandrels in succession to the various stations, is as follows:

As has been previously explained, the turret 23 is revolubly mounted in the casing 24. Mounted coaxially of and connected to said turret is the mutilated gear 63 on the shaft 50. It will be seen that on the rotation of said shaft 50, the mutilated gear 63 drives the corresponding mutilated gear 62 to rotate the turret intermittently from station to station. The locking arm 150 enters the notch 151 at the proper time to maintain the turret at rest while the tubes are being operated upon, and is withdrawn from the notch to permit rotation of the turret, in a well known manner.

The mandrels 25, 26 and 27 are all rotated in the same direction, but the mandrel 28 at the last station is rotated in the opposite direction for the purpose of dismounting the tube, as will be later more fully described. The mandrels are so rotated through the belt 64 driven by the pulley 65 on the shaft 57. Said belt 64 is tensioned by the idler pulleys 66 and 67, the belt being passed between the idler pulley 67 and the pulley 68. The idler pulley in turn drives the mandrel 28 by the engagement thereof with the mandrel pulley 69 mounted coaxially of the mandrel 28. The belt 64 also engages the pulleys 70, 71 and 72 and rotates said pulleys in the direction opposite to that in which the pulley 69 is rotated, and thereby rotates the mandrels 25, 26 and 27 in the direction opposite to that in which the mandrel 28 is rotated.

It will be understood that on the rotation of the turret, the various mandrels, which are identical in construction, are brought in succession to the various stations, so that the numerals applied in the drawings to said mandrels indicate merely, the mandrel at the particular station described at the positions indicated in Fig. 8.

As has been previously explained, after the tube 22 is mounted on the mandrel 25, the turret is given a quarter turn so that the mandrel 25 is brought to the position indicated by the mandrel 26 of Fig. 8. At this station, the turret is at rest for a sufficient period to allow the trimming operations to be performed upon both ends of the tube 22, and to permit the threading of the neck of the tube.

Normally, the neck end trimming tool 170, of the usual and well known construction, is drawn to its extreme position at the right as shown in Fig. 3. However, as the mandrel with the tube mounted thereon is brought to the trimming station, the tool 170 is moved towards the left into position to trim the end 32 of the neck of the tube.

For this purpose, the tool 170 is mounted on the reciprocatory T block 171 of Fig. 4, which slides in a corresponding groove in the frame of the machine. The pin 172 (Fig. 4) projecting from said block enters a suitable cam groove in the cam 173 mounted on the shaft 50 and thereby reciprocates the T block at the proper time into and out of engagement with the end 32 of the tube to trim said end sufficiently to expose the opening in the neck of the tube.

While the tool 170 is trimming the tube at one end and thereby pressing the tube firmly on the mandrel, the trimming wheel 75 cuts the tube to the proper length. Said trimming wheel or cutter 75 is revolubly supported as at 76 on the lever 77, (Fig. 8) which is in turn pivoted as at 78 to the bracket 79. A rod 80 (Fig. 9) having a suitable cam recess 81 therein, is reciprocated in a direction parallel to the axis of the cutter 75 so as to swing the lever 77 about its pivot 78 and to bring the cutter 75 into contact with the tube to cut it. When the lever 77 rests on the unmutilated part of the rod 80, the cutter 75 is withdrawn but when said rod is reciprocated into position wherein the cam recess 81 is directly below the lever 77, the lever drops into said recess and swings the cutter against the tube.

Figure 6:
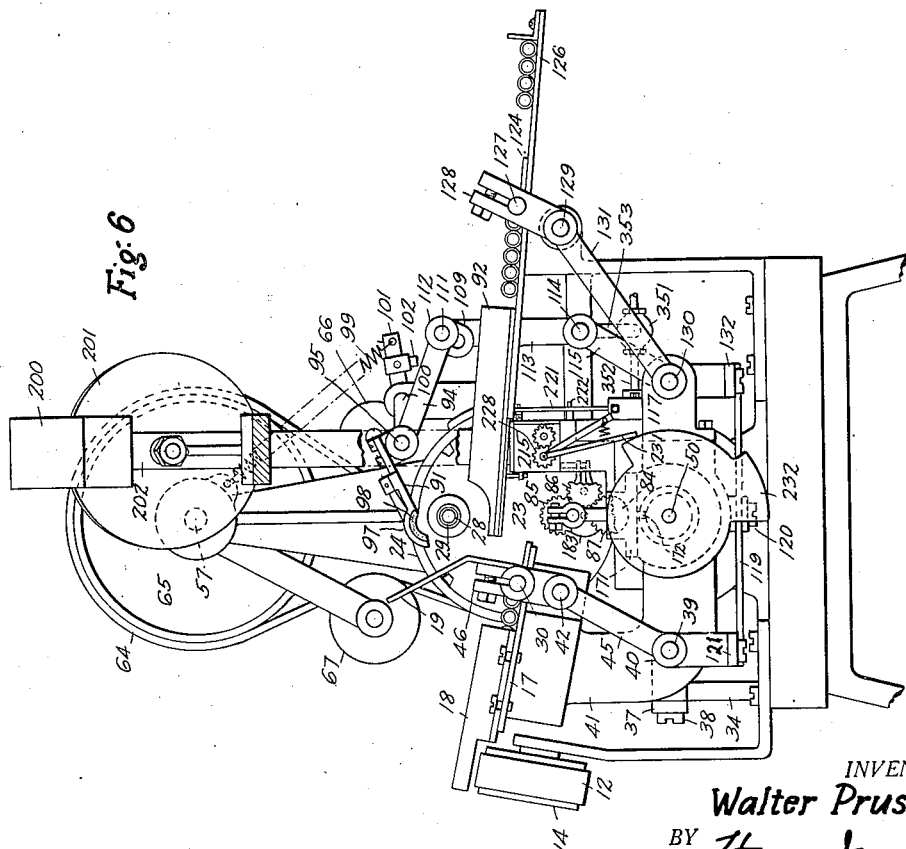
Fig. 6 is a side elevation of the mechanism shown in Figs. 3 and 4, looking at the right end thereof.

The reciprocation of the rod 80 is effected by connecting said rod to the reciprocatory T-block 171. It will be understood that the timing of the connections is such that the cutter 75 does not begin its trimming action until after the trimming tool 170 has exerted its full pressure upon the end of the tube, whereby the end 82 of the tube is cut into proper circular form and the tube is made accurately of the proper length. The trimming operation upon the open end of the tube indents said end slightly, but the indented end is later straightened and the indent removed, as will be described hereinafter. As the trimming of the neck end of the tube is completed, the neck of the tube is threaded in a manner well known in the art as by the threading rolls 183, 84 which are rotated by the rotating tube on the mandrel 26 when brought into contact with the neck of the tube, and which are maintained in the proper timed relation by the gears 85, 86 and 87 (Fig. 6). The rolls are mounted upon suitable levers and are normally out of engagement with the neck of the tube but are moved into operative position by means which are well known and hence which need not be further described.

After the trimming and neck threading operations have been completed, the turret is rotated into the next station indicated by the mandrel 27, where the indented end of the tube is straightened as is the indented end of the waste-piece cut off by the trimming operation on the open end of the tube. It is desirable that the indented ends be straightened out to allow the easy dismounting of the tube from the mandrel. The straightening operation is performed by the roll 83, carried by the lever 88 and normally spring-pulled by the spring 89 against the tube and the waste-piece, thereby pressing the indented ends against the mandrel and straightening out said ends on the rotation of the mandrel and of the tube thereon.

At this station, (indicated by the mandrel 27), caps are supplied and threaded on to the threaded neck of the tube. For this purpose, I prefer to use the mechanism illustrated in detail in Figs. 10 to 14 inclusive.

Referring to Fig. 10, I have there shown a hopper 200 which is supplied with caps by the operator or in any other suitable manner, said hopper communicating with an agitator 201 of the usual type which agitates the caps in the hopper to feed one cap at a time to the cap chute 202.

The caps fall down the cap chute by gravity until stopped by a suitable escapement, which allows one cap at a time to be released and fed to the device for screwing the cap on to the threaded neck of the tube.

As shown in Figs. 11 and 12, the escapement mechanism comprises a hook arm 203 having a lower bent end 204 entering the cap chute through the slot 205 thereof. It its upper end, the arm 203 is secured to the shaft 206 as by means of the screw 207. Said shaft 206 is mounted for oscillation in a suitable bracket 208 secured to the chute, a stop as 209 projecting from said bracket to limit the inward movement of the end 204 of the arm.

Said shaft 206 is oscillated at the proper time by means of the lever 210 secured at its upper end to said shaft and at its lower end, terminating in a suitable depending arm at 211. The means for operating the lever 210 to withdraw the bent end 204 of the arm from the interior of the chute and thereby to release the bottom one of the row of caps, into position to be fed on to the tube, will be later described. It need merely be said at this time that the row of caps 212 is supported by the end 204, until it is desired to feed a cap to the capping means, whereupon the end arm 211 of the lever is moved toward the right, as viewed in Fig. 11, swinging the shaft 206 and removing the end 204 from the chute for just a sufficient time to allow the row of caps 212 to drop downwardly a distance equal to the diameter of the head of one cap. The lever is swung back into its initial position and reinserts the end 204 underneath the next to the last cap of the row of caps just before the last cap drops into the cap applying jaws, so that only a single cap at a time is released by the arm.

The means for forwarding a cap into capping position on the tube comprises the plunger rod 214 mounted for reciprocation in the casing 215. Said plunger is secured to the reciprocatory rod 218. The spring 220 normally urges the rod 218 toward the right but does not cause movement of said rod until permitted to do so. A lever 221 pivoted as at 222 to the sliding block 171 is connected at its upper end by the link 223 to the rod 218 while its lower end, at certain times, engages an adjustable stop as 224. The casing 215 is suitably secured to, or made integral with the slide block 171, so that movement of said block causes movement of the pivot 222. As said block moves towards the right carrying the pivot 222 with it, the lower end of the lever 22 is released from the stop, thereby releasing the spring 220 to urge the rod 218 and the plunger rod 214 forwardly.

In the retracted position of the casing 215 towards the left, a pair of cap-engaging jaws 225 and 226 (Fig. 14) are in the position wherein the neck of the cap has been inserted into the open jaws. The jaw 225 is secured to a suitable shaft as 227 passing through the casing 215 and having a suitable gear as 228 mounted thereon. Said gear meshes with a similar gear 229 on the shaft 230 on which the jaw 226 is secured. It will be seen, therefore, that oscillation of the shaft 227 opens and closes the jaws alternately. Such oscillation is effected by the arm 231 on the shaft 227, which arm engages the cam 232 on the shaft 50. A suitable spring 219 secured to a second arm 233 on the shaft 227, serves to maintain the arm 231 in contact with the cam. It will be seen that on the rotation of the cam 232, the jaws are alternately opened and closed through the mechanism just described.

To insure the entrance to the jaws, of the cap, which is to be placed on the tube, I prefer to provide a suitable shutter or gate 235 arranged toward the right of the right face of the jaws. As the casing 215 is retracted, the last cap of the row in the chute is held by the chute and rests on the casing until the casing is entirely retracted whereupon the cap falls through the open part of the casing, past the retracted end of the rod 214 and into the open jaws. Said shutter 235 at this time is in its lowermost position in front of the jaws, to prevent the cap from falling out of the jaws until such time as the jaws are closed on the cap. As the casing moves forward into cap applying position, the shutter is raised and the cap is engaged with the tube of the neck, being forwarded into capping position by the movement of the casing 215 and of the plunger 214.

The shutter 235 is provided with an extension 236 pivoted to the casing as at 237 and having an upstanding arm 238 thereon. As the casing moves forwardly toward the right, the uppermost end of the arm 238 engages the adjustable stop 239 on the chute, thereby swinging said arm in a counter-clockwise direction and removing the shutter from in front of the jaws. At the same time, the spring 220 is released, whereupon the rod 218 moves forwardly and pushes the plunger 214 out, thereby forwarding the cap 234 on to the neck of the tube. Since the mandrel 27 with the tube thereon rotates continuously, the cap is automatically screwed on to the neck of the tube by the pressure of the plunger thereon, the cap rotating freely within the jaws after the cap has been tightly screwed on to the tube. The cam 232 becomes operative to open the jaws widely enough to pass the head of the cap on the retracting movement of the casing, the jaws then closing sufficiently to allow the entrance of the next cap thereinto at the proper time.

It will be understood that the plunger 214 remains in its most forwardly position during the capping operation, putting pressure on the cap while the casing 215 starts its movement toward its initial position toward the left, since the spring 220 keeps on exerting its pressure even after the casing has begun its backward movement.

It will also be understood that while the casing 215 remains forward, the cap released by the arm 203, rests partly in the chute and partly on the casing, ready to enter the jaws when released by the casing and when the jaws have reached the proper position. As the casing 215 is retracted and the plunger begins to move back, the cap still rests on the casing. However, the pivot 237 being carried backwardly, the arm 238 is rotated in a clock-wise direction under the influence of the spring 291, thereby re-arranging the shutter 235 in front of the jaws.

At the same time, the pin 292 engages the end 211 of the lever 210 and inserts the end 204 of the arm 203 into the chute between the last two caps in the chute, the end 211 being sufficiently flexible to permit the passage of the pin 292 from one side to the other side thereof. When the slide block has moved back sufficiently, the lever 221 engages the stop 224 whereupon further movement of the casing and of the slide block connected thereto retracts the rod 218.

It will be understood that the jaws 225 and 226 move with the casing so that on the completion of the retracting movement, the cap which has rested on the casing drops into the jaws. The cam 232 thereupon becomes operative to close the jaws on the cap, ready for the repetition of the capping operation. It will be understood that said cam 232 is of sufficient width to permit the arm 231 to engage said cam throughout the stroke of the casing 215.

At the station indicated by the mandrel 28 (Fig. 6), the capped tube, together with the waste piece 90, is dismounted from the mandrel 80 by the wiper arm 91, and drops into the inclined chute 92 from which the tube is transferred to the enameling mechanism 305.

The wiper arm 91 is secured as by means of the screws 93 to the lever 94, which is in turn loosely mounted on the shaft 95. The arm 91 terminates the preferably semi-cylindrical portion 97, in which is inserted a suitable substantially semi-cylindrical member 98 of comparatively soft material, for engaging the tube on the mandrel 28 and for dismounting said tube.

The member 98 may be made of leather, cloth or other suitable soft and yieldable material adapted to engage and press upon the tube, without danger of injury thereto or deformation thereof.

The shaft 95 is straight and of sufficient length to allow movement of the lever 94 as a unit, along, and relatively to, the shaft to perform the dismounting operation.

The left end or extension 100 of said shaft, however, is bent forwardly of the part on which the lever is mounted, and is supported by suitable bearings 96 upstanding from the frame of the machine. It will be seen that rotation of the extension 100 in the bearings 96, rocks the lever 94 to engage and disengage the member 98 with and from the tube on the mandrel, the shaft 95 serving as a crank for that purpose.

The means for rocking the shaft end 100 comprises the crank 101, secured to said shaft and normally pulled by the spring 99 in the proper direction to rotate the shaft 100 in a counter-clockwise direction, as viewed in Fig. 6, and to bring the member 98 into engagement with the tube. The crank 101 is oscillated in turn, through the link 102 secured at its lower end 103 to the lever 104, which is pivoted at 105 to a suitable bracket 106 extending from the frame of the machine, and which terminates in the cam roller 107 engaging the cam 108 on the shaft 50.

The roller 107 being normally on the high part of the cam, the member 98 is normally maintained out of engagement with the tube. On rotation of the shaft 50, however, the roller 107 drops to the lower part of the cam under the influence of the spring 99 at the proper time to rock the lever 104 in a counter-clockwise direction, thereby oscillating the crank 101 through the link 102, whereby the extension 100 is oscillated and the shaft 95 carries the lever 94 into tube-engaging position.

It will be noted that the end 109 of the lever 94 is slotted as at 110 to encompass the rod 111 so that the rocking movement of the lever may be performed without removing the end 109 from the rod 111. Said end 109, while loose on the rod 111, moves with said rod, being maintained at a predetermined point along said rod by means of suitable collars 112 secured to the rod on each side of the lever.

It will be seen that on longitudinal movement of the rod 111, the lever 94 is carried by said rod alternately the proper distance to the right and to the left as viewed in Figs. 3 and 4.

When moved towards the right, the spring 99 is allowed to become effective to oscillate the shaft 100 and to bring the member 98 into frictional engagement with the tube, whereafter the movement of the rod 111 serves to dismount the tube from the mandrel 98. Prior to the movement of the rod 111 toward the left, the roller 107 is on the high part of the cam 108 and the lever 94 is thereby oscillated to remove the member 98 from its engagement with the tube. The link 113 connects the rod 111 to the parallel rod 114 which is suitably mounted on the bracket 106 whereby movement of the rod 114 causes similar movement of the rod 111.

The rod 114 is reciprocated by means of the link 115 secured at one end to said rod and at its other end to the parallel rod 116 which slides in the bracket 117. The rod 116 is in turn reciprocated by the connecting member 118, secured to one end of the lever 119, which is pivoted as at 120 to the frame of the machine. At its other end 121, the lever 119 is secured, as by means of the link 122 and the connecting member 123, to the reciprocating rod 39 (Figs. 3 and 4).

It will be seen that as the crank disc 34 rotates and reciprocates the rod 39, the lever 119 is oscillated, thereby sliding the rods 116, 114 and 111, and thereby causing reciprocation of the lever 94 at the proper time to dismount the straightened tube from the mandrel 28, and to further dismount the straightened waste member 90, the engaging member 98 being sufficiently long for that purpose and engaging the tube with sufficient friction to hold it while it slides nevertheless on the mandrel, the member 98 cooperating with the mandrel to hold the tube therebetween during the dismounting operation.

It will be remembered that the tip 29 of the mandrel has been threaded into the inner face of the neck 33 of the tube and that the tube cannot be dismounted from the mandrel without first being disengaged from said tip. It is for this reason that the dismounting mandrel 28 is rotated in a direction opposite to that in which the remaining mandrels are rotated. When the lever 94, therefore, is rocked so that its engaging member 98 engages the tube, the tube is held stationary by said member by reason of the frictional engagement thereof during the continuous rotation of the mandrel in the proper direction first to disengage the tip from the tube neck. It is only after this disengagement has been completed that the lever 94 is moved toward the right to dismount the tube.

After the dismounting operation has been completed, the turret is again rotated by means of the mutilated gears 62 and 63 to bring the mandrel 28 into the position of the mandrel 25, ready for the mounting of a new tube thereon and the cycle of operations above described is automatically repeated.

As has been above indicated, the dismounted tube falls on the chute 92 and rolls down against the angle plate 124, the tubes being guided by the adjustable angle plate 125 secured to said chute so as to maintain the row of tubes in substantially aligned position as indicated in Fig. 3.

The end tube of the row may be then transferred for further operation thereon directly to the enameling mechanism 305, or it may first be forwarded to a suitable receiving plate as 126. The transfer or forwarding of the tubes is accomplished automatically through the reciprocating rod 127, which is connected by the connecting member 128 to the reciprocating rod 129, said rod being in turn connected to the rod 130 as by means of the connecting member 131.

The rod 130 is in turn reciprocated through its connection as at 132 to the reciprocating rod 116. It will therefore be seen that as the rod 116 is reciprocated, as previously described, the rod 127 is similarly reciprocated. In its extreme position toward the right, said rod 127 is out of the way of the row of tubes which roll down the chute 92 until the last tube of the row rests against the stop plate 124.

On the reciprocation of the rod 127 toward the left, the end 133 of said rod engages the capped end of the tube and forwards said tube toward the left either directly on to a suitable mandrel or conveyor or on to the plate 126, where the tubes may be inspected and again mounted on the turret 304 of the enameling mechanism.

Since the threading and end trimming operations result in the accumulation of shavings on the bed of the machine, I prefer to provide means for sweeping the bed free of such shavings after each rotation of the turret.

Said means comprises the air pump 350, (Fig. 10), suitably supported by the frame of the machine, and connected to a suitable valve as 351 from which in turn a nozzle 352 (Fig. 6) extends in the proper direction to blow air at the proper intervals across that point of the machine bed on which the shavings accumulate. An arm as 353 extends from the link 113 and engages the valve to open it on each reciprocation of the rod 114. The pump 350 is simultaneously operated to blow air to the valve as by means of the lever 354, pivoted to the frame of the machine as at 355, and connected to the piston rod 356 as at 357. The upper end 358 of said lever is connected to the rod 114, and is retracted thereby at the proper time to deliver the blast of air through the nozzle 352, whereby the bed is blown clear of accumulated material on each movement of the turret.

*Reciprocating transfer mechanism*

The mechanism for transferring the capped tube from the plate 126 to one of the mandrels as 359, (Fig. 1) of the turret 304, comprises a rod as 360, similar to the rod 127, and supported as by means of the link 361 by the reciprocating rod 362. A suitable bearing as 363 supports the rod 362 which is reciprocated at the proper time to forward the capped tube on to the mandrel 359 as by means of the connection 364 connected to any suitable reciprocating part of the machine. Means well known in the art and designated by the operating means 365 rotates the turret 304 intermittently to carry the tube on the mandrel into contact with the enameling roll 366, rotating in the enameled box 367, whereby the surface of the tube is given a coat of enamel of a desired color.

After the tube has been enameled, the turret is again moved to bring the capped tube into the position indicated at 368 (Fig. 1), it being understood that enamel is still wet at this time.

*Reciprocating and oscillating transfer*

Means such as shown in my co-pending application for patent for Method and mechanism for making collapsible tubes, Serial No. 295,332, filed July 21st, 1928, are therefore provided for removing the wet tube from the mandrel of the turret 304 and for mounting said tube on to the conveyor 307 on which the tube is dried. The transfer means designated by the numeral 306 comprises a pair of gripping jaws 369 and 1...

370 normally drawn together by the spring 371 (Fig. 2). Each of said jaws is pivoted to the block 372, said jaws being spread apart at the proper time to close about the cap of the tube. Toward this end, I have provided a lever 373, pivoted to an extension 374 of the block as at 375, and suitably connected to an extension 376 of the plunger 377, as by the slot and pin connection 378. Said block 372 is mounted co-axially of and on the gear wheel 379. The gear wheel 379 is reciprocated on the rack 380, as by means of the reciprocating link 381, operatively connected to the gear and operated by a suitable reciprocating part of the machine.

It will be seen that in the position of the gear wheel 379 at the extreme left, the lever 373 strikes the stationary stop 382, the upper end of said lever being halted by said stop while the pivot 372 thereof continues to move towards the left, whereby the plunger 377 moves towards the left relatively to the jaws 369 and opens said jaws, thereby positioning the jaws about the cap on the tube, in the proper position to close upon the cap when the lever 373 is released by the stop 382.

As the link 381 now moves the gear wheel 379 towards the right, the lever 373 is released by the stop whereupon the jaws 369 and 370 close upon the cap and remove the capped tube from the mandrel. A suitable clutch indicated at 383 is interposed between the block 372 and the gear wheel whereby the gear wheel may rotate in its movement toward the right without rotating said block and the tube may be drawn straight off the mandrel. On the continued movement of the gear 379 toward the right, however, the clutch 383 connects the block to the gear wheel and the entire block is rotated through an angle of approximately 180°, whereafter the clutch 383 ceases to operate. The tube is thereby aligned with one of the pins 384 of the conveyor 307, whereupon on further movement of the gear wheel toward the right, the capped tube is inserted straight on one of said pins 384, which has previously been brought in the proper position, the movement of the conveyor 307 being synchronized with the operation of the transfer mechanism 306 to accomplish this end.

After the tube has been inserted on the pin 384, the lever 373 strikes the stop 385, whereby the movement of the upper end of the lever is arrested and the jaws 369 and 370 opened on the continued linear movement of the gear wheel, to release the tube. The movement of the parts is now reversed by the link 381, the gear and block 372 being carried back toward the left without rotations whereafter the operation is repeated, whereby the wet enameled tubes are removed from the enameling machine and automatically mounted on the conveyor pins in succession. The wet tubes mounted on the pins 384 are now carried into the heated drying box 308, the conveyor chain being guided about a series of suitable pulleys as 386, the number of which is sufficient to maintain the tubes in the box for the proper time to dry the tubes thoroughly before emerging from said box.

The dried and capped tubes are now ready to be printed. Said tubes are therefore removed from the conveyor pins and transferred to the printing machine 313 by the removal mechanism 309 shown in detail in Figs. 15 to 17 inclusive. As there shown, the reciprocating rod 400 carries the plate 401, which is arranged to engage the open end of the tube and on the reciprocation of said rod to the left, to remove the capped and enameled tube which hangs loosely on the pin 384. A suitable stop or cross member as 402 is arranged across the entrance to the chute 310 and in the path of the tube thus removed from the pin. It will be noted, as shown by the dotted lines of Fig. 15, that the heavier end of the tube begins to fall as the tube is removed from the pin, and that the stop 402 serves as a pivot whereby the tube may be over-balanced and turned over or reversed into a position wherein the capped end of the tube is toward the right, instead of toward the left, the curved surface 403 of the chute 310 aiding to reverse or turn over the tube. From the bottom of the chute, the tube falls on to the moving belt 410 and is carried thereby on to the feed plate 311.

From said plate, the transfer mechanism 312, which is similar in operation and construction to the transfer mechanism consisting of the parts 360 to 364 inclusive, serves to mount the tubes on the mandrels of the printing mechanism 313, said printing mechanism being similar to the enameling mechanism.

A detailed description thereof is deemed unnecessary. It need merely be said, however, that the rod 360 of the mechanism 312 serves the purpose of removing the capped and enameled tubes from the plate 311 and for mounting said tubes on the mandrel 359 of the printing mechanism, and that the reciprocating rod 362 of the transfer mechanism 312 is operatively connected to the rod 400, for removing the tubes from the pins 384, by means of a suitable link as 409.

As explained in connection with the enameling mechanism 305, the capped, enameled and printed tubes are transferred from the mandrels of the printing mechanism 314 which is similar in all respects to the transfer mechanism 306 previously described, and the description of which hence need not be repeated. The printed tubes which are still wet after being mounted on the pins 408 of the conveyor 315, are carried through the drying box 316 for a sufficient time to dry the tubes thoroughly. Thereafter, the tubes may be lacquered by the lacquering mechanism 317 and again dried in the drying box 318, if desired, or the printed, enameled and capped tubes may be removed from the pins 408 without lacquering.

From the above description, it will be seen that I have provided a mechanism which operates completely automatically on the supply by one or more operators of slugs to the press, caps to the capping mechanism and the proper enamel, ink and lacquer to the means for applying these materials to the tubes. Since the above description points out the various steps in the process of completing the tube, and further points out the operation of the mechanism, a separate description of the operation of the mechanism is not here necessary.

It will be understood, however, that my improved mechanism and method have important advantages of labor-saving and the avoidance of damage and waste by injury to the tubes which would result from the use of heretofore known processes and mechanisms requiring manual handling of the tube at various stages of the operation thereon.

While I have shown and described certain specific embodiments of my invention, it will be understood that I do not intend to limit myself thereto but intend to claim my invention as broadly as may be permitted by the state of the prior art and the scope of the appended claims.

I claim:

1. In a machine for making thin metal collapsible tubes, means for extruding a tube from a blank, means for trimming the ends of the tube, for threading the neck thereof, and for applying a cap to the threaded neck, means for advancing the tube from the extruding means to the trimming and capping means, means for enameling the tube, means for dismounting the capped tube from the trimming and capping means, and for mounting the capped tube on the enameling means, means for removing the capped and enameled tube from the enameling means, means for advancing and drying the enameled tube, means for removing the tube from the advancing means and for mounting said tube on a printing means, means for printing the tube, means for removing the printed tube from the printing means, and means for again advancing and drying the printed tube.

2. In a machine for making collapsible tubes, means for trimming both ends of a tube, for threading one end thereof, and for mounting a cap on the threaded end, means for supplying tubes to said trimming, threading and capping means, means for dismounting the tube from said trimming, threading and capping means, tube enameling means, means for mounting the dismounted tube on the enameling means, means for dismounting the enameled tube from the enameling means while the enamel thereon is still wet, and for mounting said wet enameled tube on a conveyor, a conveyor having pins thereon for the reception of the wet enameled tube, and means for drying the enameled tube.

3. In mechanism of the character described, means for finishing a tube, means for enameling the finished tube, means for mounting a tube on said enameling means, a conveyor, means for transferring the enameled tube from the enameling means to the conveyor, means for drying the enameled tube, means for printing the tube, means for transferring the tube from the conveyor to the printing means and means for drying the printed tube.

4. In mechanism of the character described, a tube-holding mandrel, means for mounting a tube on the mandrel, means for engaging and withdrawing the tube from the mandrel, a conveyor, spaced parallel pins carried by and projecting from said conveyor, and means for discharging the tube from said tube engaging means and on to one of said pins.

5. In mechanism of the character described, means for extruding a collapsible tube from a disc, means for advancing the tube, tube-finishing and capping means including a series of mandrels, means for mounting the tube on one of said mandrels, means for trimming both ends of the tube while it is on the mandrel, means for threading the neck of the tube, means for applying a cap to the threaded neck, means for engaging the outer cylindrical surface of the capped tube for dismounting the tube from the mandrel, and means including a reciprocatory rod for advancing the capped tube for further operation thereon.

6. In mechanism of the character described, means for extruding soft metal collapsible tubes from discs, means for advancing the extruded tube, and means for finishing and capping the tube comprising means for supporting the tube, means for mounting the tube on the supporting means, means for capping the tube, means for dismounting the tube from the supporting means, and means for further advancing the capped tube including a reciprocatory rod, an inclined chute and a second reciprocatory rod.

7. In mechanism of the character described, means for extruding soft metal collapsible tubes from discs, means for advancing the extruded tube, means for finishing and capping the tube comprising means for supporting the tube, means for mounting the tube on the supporting means, and means for capping the tube, means for enameling the tube, including a mandrel, means for dismounting the tube from the supporting means and for mounting the tube on the mandrel, and means for drying the tube.

8. In mechanism of the character described, means for finishing and capping a tube including a mandrel, means for supplying unfinished tubes to said finishing and capping means, means for enameling the tube including a mandrel, means for dismounting the finished and capped tube from the first-mentioned mandrel and for mounting the tube on the second-mentioned mandrel, and means for drying the enameled tube including means for advancing and simultaneously heating said tube.

9. In mechanism of the character described, means for finishing and capping a tube, means for enameling the capped tube, means for dismounting the finished and capped tube from the finishing and capping means and for mounting the tube on the enameling means, means for dismounting the enameled tube from the enameling means and for transferring the tube to mechanism for further operation thereon, means for drying the enameled tube after it has been transferred, means for printing the tube, and means for again drying the tube.

10. In mechanism of the character described, means for extruding a collapsible tube, means for advancing said tube to trimming and capping mechanism, mechanism for trimming and capping the tube including a series of mandrels, means for mounting a tube on each of the mandrels, a cap hopper, means for supplying a cap to a tube on the mandrel and for mounting the cap on the tube, means for dismounting the capped tube, and means including a reciprocatory rod and an inclined chute for advancing the capped tube.

11. In mechanism of the character described, means for supporting a tube for operation thereon, means for mounting said tube on the supporting means, means for dismounting the tube from the supporting means, a second supporting means, means for mounting the dismounted tube on the second supporting means, means for enameling the tube on the second supporting means, a conveyor, and means for dismounting the tube from the second supporting means and for mounting the tube on the conveyor.

12. In mechanism of the character described, a series of spaced mechanisms each including a revoluble cylindrical mandrel shaped to fit and to receive a collapsible tube, and each including, further, means for operating upon the tube on the mandrel, and means for transferring the tube from the mandrel of one of said mechanisms to the mandrel of the succeeding mechanism.

13. In mechanism of the character described, a series of mechanisms each including a revoluble mandrel for the reception and support of a collapsible tube, and each including, further, means for operating upon the tube on the mandrel, reciprocatory means for transferring the tube from the mandrel of one of said mechanisms to the mandrel of the succeeding mechanism, and a conveyor interposed between the mandrels of at least two of said mechanisms for the reception of a tube dismounted from the mandrel of one of the mechanisms and for the transfer of said tube to the means for transferring the tube to the mandrel of the succeeding mechanism.

14. In mechanism of the character described, a mandrel, means for mounting a tube upon the mandrel, a second mandrel, means for operating upon the tube on the second mandrel, and means interposed between the mandrels for dismounting a tube on one of the mandrels after it has been operated upon and for mounting the tube on the other mandrel preparatory to further operation thereon.

15. In mechanism of the character described, means for applying a coating of wet material to a tube including a revoluble mandrel, means for mounting a tube upon the mandrel, a conveyor, means for dismounting the coated tube from the mandrel and for transferring the tube to the conveyor, a second coating means including a mandrel, and means for dismounting the tube from the conveyor and for mounting the tube upon the mandrel of the second mechanism.

16. In mechanism of the character described, means for mounting, trimming, threading and capping a tube, means for coating the tube including a mandrel, means for dismounting the capped tube and for mounting the tube on the mandrel, a second coating means including a mandrel, and means interposed between the first-mentioned coating means and a second coating means for removing the coated tube from the mandrel of the first-mentioned means, for drying the tube and for mounting the dried tube on the mandrel of the second coating means.

17. In mechanism of the character described, tube-finishing and capping means including a mandrel, means for mounting a tube upon the mandrel, means for operating upon the tube on the mandrel to trim, thread and cap the tube, means for dismounting the capped tube from the mandrel, a first coating means including a mandrel, means for mounting the capped tube on the mandrel of the coating means, a second coating means including a mandrel, and means for transferring the coated tube from the mandrel of the first coating means to the mandrel of the second coating means and for drying the tube during the transfer thereof.

18. In a machine of the character described, a conveyor, spaced members on the conveyor each adapted to be inserted into a collapsible tube for holding and carrying said tube, a mandrel spaced from said members, and means for removing the tube from the conveyor and for mounting said tube on the mandrel comprising a reciprocating rod, a plate on said rod for engaging a tube on one of the pins and for pushing on the open end of the tube to remove it from the supporting member therefor, a chute for receiving the tube thus removed from the pin, said chute being shaped to receive the threaded end of the tube first and to turn said tube through an angle of 180°, a cross member in the path of the removed tube and at the chute entrance for controlling the movement of the removed tube, means at the discharge end of the chute for advancing the tube longitudinally and for aligning a series of tubes in a row with the corresponding ends thereof in one direction, and a reciprocating rod for engaging the end of the tube and for mounting the tube upon the mandrel.

19. In a machine of the character described, a conveyor, spaced members on the conveyor each adapted to have a tube mounted thereabout, a reciprocating member for removing the tube from the member, a chute for receiving the removed tube and for delivering said tube in a horizontal position opposite to the position of the tube on the member, and means for receiving the advanced tube and for mounting the tube on a mandrel.

20. In a machine of the character described, means for supporting a collapsible tube, means for dismounting the tube from said supporting means, a chute for receiving the dismounted tube and for further advancing the tube by gravity, and means adjacent the discharge end of the chute for mounting the tube discharged from the chute upon a mandrel.

21. In a machine of the character described, a moving conveyor pin adapted to advance and loosely hold a tube, a chute, a member arranged across the entrance of the chute, a reciprocatory rod for pushing the tube off the pin and against said member to partly rotate said tube in a vertical plane whereby the tube drops into the chute by gravity and the position thereof is reversed, and means for advancing the tube discharged from the chute and for mounting the tube on a mandrel.

22. In a machine of the character described, a conveyor adapted to receive and advance collapsible tubes, reciprocatory means for dismounting a tube from the conveyor and for forwarding the tube, a chute for receiving the tube thus removed and forwarded, and reciprocatory means including a rod to push upon an end of the tube for mounting the tube upon a mandrel.

23. In a machine for operating upon collapsible tubes, means for capping the tube comprising a cap hopper for delivering one cap at a time, a pair of gripping jaws for receiving one cap at a time from the hopper, means for moving said jaws bodily toward the capping position, means for alternately opening and closing said jaws to grip and to release the cap alternately, and reciprocatory means for moving the cap out of the jaws when the jaws are in their open position at the capping position.

24. In a machine for operating upon collapsible tubes, means for capping a tube comprising a cap hopper, a chute communicating with said hopper, an escapement permitting a single cap at a time only to be discharged from the chute, reciprocatory means for receiving the cap released from the chute comprising a pair of pivoted jaws, means for closing the jaws after the cap has been received thereby and for opening the jaws at the capping position and for further opening the jaws on the return stroke of said reciprocatory means toward the cap receiving position, and a plunger carried by said reciprocatory means and reciprocatory relatively thereto to forward the cap out of the jaws.

25. In mechanism of the character described, means for capping the tube comprising a revoluble mandrel for supporting a tube, a cap hopper, a chute communicating with the hopper, an escapement on the chute for supporting the row of caps in the chute and for releasing one of said caps at a time, a reciprocatory carriage, a pair of cap-gripping jaws pivoted to the carriage and adapted to receive a cap released by the escapement, means for opening and closing said jaws, and a reciprocating spring-pressed rod supported by the carriage for advancing a cap gripped by the jaws in the direction of the reciprocation of said carriage and on to the tube on the mandrel and beyond the carriage.

26. In mechanism of the character described, means for delivering a cap into position for insertion thereof on a tube comprising a cap hopper, a chute communicating with the hopper and adapted to arrange a series of caps in a substantially vertical row therein, an escapement on the chute for releasing a single cap at a time from the bottom of the row, a carriage reciprocating across the lower end of the chute, a reciprocatory spring-pressed rod carried by the carriage, a pair of pivoted jaws having an opening therein arranged coaxially of the rod and in advance of the retracted position of the rod, means for opening and closing said jaws, means for reciprocating said carriage to retract the carriage into a position wherein the released cap in the chute drops into said jaws, an oscillatory shutter arranged forwardly of the carriage to prevent disarrangement of the released cap before the cap has entered said jaws.

27. In mechanism of the character described, revoluble means for supporting a tube, means for mounting a tube on said supporting means, means for trimming and threading the tube, means for capping the tube including means for delivering a single cap at a time toward the setting position, and means for feeding the cap axially toward the supporting means, means for dismounting the capped tube from the supporting means, a second supporting means in spaced relation to the first-mentioned supporting means, and means for advancing the capped tube and for mounting said tube on the second supporting means.

WALTER PRUSSING.